United States Patent [19]

Zwicky et al.

[11] 4,170,361
[45] Oct. 9, 1979

[54] BEARING ARRANGEMENT FOR A RECORD PLAYER TONEARM

[75] Inventors: Paul Zwicky, Dielsdorf; Eduard Marthaler, Zürich, both of Switzerland

[73] Assignee: Willi Studer, Switzerland

[21] Appl. No.: 902,217

[22] Filed: May 2, 1978

[30] Foreign Application Priority Data

May 13, 1977 [CH] Switzerland .................... 6046/77

[51] Int. Cl.² ............................................ G11B 3/12
[52] U.S. Cl. ............................ 274/23 A; 274/23 R
[58] Field of Search ...................... 274/23 R, 23 A

[56] References Cited

U.S. PATENT DOCUMENTS

| 3,479,038 | 11/1969 | Eisner | 274/23 A |
| 3,779,563 | 12/1973 | Irisawa | 274/23 R |
| 4,065,188 | 12/1977 | Ridler et al. | 274/23 A |

Primary Examiner—Charles E. Phillips
Attorney, Agent, or Firm—Roylance, Abrams, Berdo & Farley

[57] ABSTRACT

The disclosed arrangement is for a short pickup arm used with a tangential scanning system. The arm is supported on a single jewel thrust bearing and held against sideways tilting by a pair of attracting magnets, one mounted on the arm above the bearing and the other fixed above the first. This permits the arm to move freely in a plane parallel to the record and in a plane perpendicular to the record and tangent to the grooves. The center of gravity of the arm is chosen to be on a line between the bearing point and the stylus point in order to minimize the effects of outside disturbances.

8 Claims, 1 Drawing Figure

BEARING ARRANGEMENT FOR A RECORD PLAYER TONEARM

BACKGROUND OF THE INVENTION

The invention relates to a support for a sound pickup in a record player, having a tangential scanning mechanism for the pickup.

In order to reduce scanning errors, record players are increasingly being provided with a tangential scanning guide for the sound pickup. In general, these structures are pickup arms having conventional dimensions as used for the radial tonearm scanning of records and which by means of controls are guided over the surface of the record along a record radius in a straight line, and not along an arc.

It is known to use such arrangements in tangential scanning systems, and with a very short tonearm, or pickup arm, for the phono cartridge, or sound pickup element. By this a number of advantages are obtained. However, problems occur in connection with the mechanical support for such pickup arms, partly due to the small dimensions, which with the very limited forces which are available may lead to imprecise guidance and stoppages. Extremely high demands are made on such pickup arms because, when scanning the sound grooves with such a limited stylus force, they must also supply the input for the control of the parallel feed mechanism, whereby they must exert only a negligible tracking pressure on the sides of the grooves. As far as possible, any friction must be avoided or reduced to a minimum, this applying to all movement directions in which a sound pickup element can move.

In connection with the mentioned short pickup arms, minimum frictional losses are obtained by bearing them at a single point, so that the pivot position of the arm in the horizontal plane is defined. To permit a vertical or approximately vertical movement of the scanning sound element, the arm must be pivotable about the point or jewel thrust bearing in a vertical plane given by the point of support and the tip of the scanning needle, or stylus. The pickup arm must not tilt sideways by moving in the direction of the vertical plane which is at right angles to this first plane. It is therefore common to provide a guide in a slot which prevents such a tilting movement. A further necessary degree of freedom of the arm is the rotation about a vertical axis passing through the jewel thrust bearing, which at the same time must not impede the pivotal movement about the point of support.

GENERAL DESCRIPTION OF THE INVENTION

In a novel arrangement in accordance with the present invention, a sideways tilting movement of the pickup arm, which is mechanically supported at only a single point in a vertical plane located in the direction of a radius of the record, is prevented by magnetic forces acting on the arm. A movement in a vertical plane located tangentially to the sound grooves and in a plane parallel to the record can take place freely without mechanical guides.

In connection with this construction, certain fundamental details must be observed which permit a satisfactory construction of the pickup arm for the sound pickup element, while providing possibilities for the necessary free movements and the prevented movements. According to the invention, such a pickup arm which is supported at only one point carries in its upper part a permanent magnet above the jewel bearing and the first magnet interacts with a second fixed and superimposed magnet of opposite polarity via an air gap. The poles, which attract one another, bring about on the one hand a vertical position of the arm which can be maintained free from any mechanical support or guidance, and on the other relieves the pressure on the jewel bearing caused by the weight of the pickup arm. The dimensioning of the necessary directing or relieving forces is possible in a completely satisfactory manner by appropriate selection of the magnets and their reciprocal spacings.

In order to permit the free rotation of the pickup arm about a vertical axis while also ensuring that during this movement there is a complete uniformity of the force pattern and independence of the angular position, according to another feature of the invention the permanent magnet located on the arm above the jewel bearing is given a circular cross-section and has a vertical central axis passing through the bearing point of the jewel bearing. Giving the permanent magnet connected to the arm a circular cross-section, permits a free rotation of the magnet relative to the fixed magnetic pole arranged above it, i.e. permits a lateral pivoting of the arm. It is pointed out that the rotary movements about the vertical axis which occur in practice are only of the very small angular magnitudes which are necessary with optically controlled scanning to control the tangential movement of the complete scanning unit.

The shaping and dimensioning of the second magnet, arranged above the first cylindrical magnet, are based on functional considerations. The two magnets are magnetized in oppositely poled manner and therefore attract one another. However, they are not in contact and instead have a specific spacing relative to one another. Thus, the cylindrical magnet which is freely movable with the arm tends to be in alignment with the upper magnet. In addition, with correct dimensioning, the force of attraction relieves the load on the jewel bearing, because part of the arm weight is compensated. The reciprocal interaction of the magnets means that the lines placed through the jewel bearing and central axis of the cylindrical magnet are always directed at the center of the fixed magnet and the arm is magnetically biased in this position, without mechanical aids. A further movement of the arm in the vertical plane is required for the removal or setting of the scanning needle on the record. This degree of freedom of the movement is possible without prejudicing the important and, as far as possible, rigid guidance in the pivotal movement of the arm at right angles thereto about the point of support by utilizing another feature of the invention according to which the permanent magnet fixed above the arm has in the direction of the radius of the record a width dimension which coincides with the diameter of the cylindrical magnet fixed to the arm, but has a larger dimension perpendicular thereto in the tangential direction of the grooves of the record. Thus, the two facing magnetic poles are formed on the one hand from a circular surface and on the other from a rectangle, whose width is the same as the diameter of the circle and whose length corresponds to the necessary path of the cylindrical magnet. The magnetic directing forces hold the circular pole within the width of the rectangular pole face, but permit a substantially directivity-free displaceability in the longitudinal direction thereof.

The complete movable unit of the scanning system comprising the sound pickup arm, jewel bearing, controlling magnet, and counterweight must be as insensitive as possible to any external disturbances, particularly those in the form of vibrations. According to another feature of the invention, the mass distribution of the complete system is selected in such a way that the center of gravity is located on the connecting line between the jewel bearing point and the tip of the scanning needle. Any tilting moments or torques of the system occurring during accelerations or decelerations, e.g. blows on the record player housing, are consequently made largely harmless in this way.

As stated above, the functionally dependent movements of the complete scanning system must take place in a substantially friction-free manner and only in specific degrees of freedom. However, in view of the necessary very high precision, certain other standpoints have to be taken into consideration which are linked with the possibility of the occurrence of resonance phenomena or their avoidance.

Account must also be taken of the possible transmission of vibrations and the like from the ambient. It has been found that the various partly harmful influences can be reduced or eliminated in this system, which because it has masses subject to force vectors necessarily is subject to natural vibrations. The pickup arm must be damped during movements. Consequently, according to another feature of the invention, the vibration system formed by the moment of inertia of the arm and the magnetic directing forces is damped in such a way that an energy factor of less than unity is obtained. Very favourable rumble values can be obtained, and the externally caused disturbing influences can be filtered out by means of aperiodic or preferably overperiodic damping, in conjunction with a fixing of the mechanical resonance to suitable ranges. The selection of the damping values is achieved by appropriate dimensioning of the apparatus provided for this purpose, whereby according to another feature, the movements of the arm are damped by means of a viscous liquid.

In addition to the dimensioning requirements which affect the design of the pickup arm and its characteristics, another point is important for the mechanical constructions, namely the extremely low friction supporting of the pickup arm at a single support point, which is decisive for the basic concept of "magnetic suspension". From a purely mechanical standpoint, the construction of the bearing must have as little friction as possible. Therefore, according to another feature of the invention, the jewel thrust bearing for the arm is constructed as a hardened tip located in the depression of a jewel.

DESCRIPTION OF A PREFERRED EMBODIMENT

Figure 1:
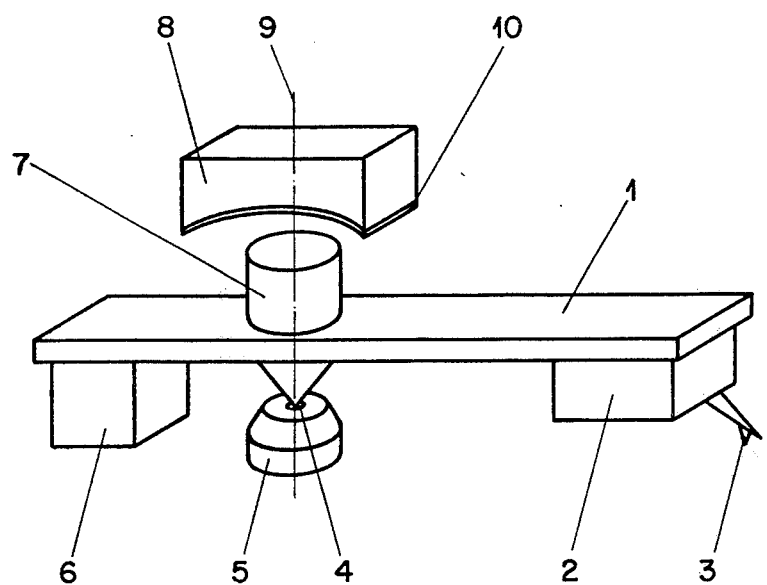

The perspective drawing of FIG. 1 shows a pickup arm 1 which at its end carries a sound pickup element 2, whose scanning needle tip 3 runs in the grooves of the record. Arm 1 is mounted on a jewel thrust bearing comprising tip 4 in a jewel 5 provided with a correspondingly dimensioned depression, as is particularly known in the clock and measuring instrument industry. At its shorter end the arm carries a counterweight 6, diagrammatically shown as a parallelepiped, which not only with regard to its mass, but also with regard to its shape must be such as to fulfill the condition that the center of gravity is located on the connecting line between the point of support of the scanning needle 3 and tip 4. In the represented arrangement, the pickup arm can move freely about the tip of the jewel bearing in any direction. So that there can be only a clearly defined limitation of the movement within specific planes, there is fixed to the top of arm 1 a cylindrical permanent magnet 7, whose upwardly directed pole face, for example a north pole, faces a fixed second magnet 8. The magnetization direction of the second permanent magnet is selected in such a way that the downwardly directed face is polarised oppositely to the first magnet, i.e. in this case carries a south pole. The opposite poles of the two permanent magnets attract one another, i.e. pickup arm 1 is held in stable manner in the indicated position. The pole face of magnet 7 is always directed against magnet 8, for example. As a result, a tilting of the complete system is prevented. The reciprocal attraction between arm and fixed magnet could, with an appropriate selection of the forces and/or spacings, also be increased until the movable system was lifted out of the jewel bearing, which is naturally undesirable. However, with correct dimensioning, it is possible to bring about a corresponding reduction of the pressure of tip on jewel 5. This constitutes a further measure which reduces friction in the jewel bearing. Without any substantial change to the conditions, the upper magnet 8 can be replaced by a non-permanent magnetic material, e.g. soft iron, because the forces of attraction are adjustable by corresponding dimensioning and selection of the spacings.

In the arrangement described, pickup arm 1 can be rotated about axis 9, shown by dotted lines, formed from the connecting line of the central axis of magnet 7 and jewel bearing 4, 5. This degree of freedom of the movement is necessary for the operation, because the guidance of the scanning needle 3 in the sound groove through a minimal deviation from its rest position supplies the control quantity for the follow-up movement of scanning at right angles to the grooves. During this rotary movement, the axis 9 remains in the drawing plane. A possibility of the axis 9 being tilted to the front or back out of the drawing plane must be reliably prevented, because it would lead to a tilting of the scanning tip 3 in the sound groove. In order to prevent this possibility, the diameter of the pole face of permanent magnet 7 is made the smae as the width of the fixed magnet 8 in a direction perpendicular to the drawing plane. The direction of the attracting forces of the two opposite poles, which coincides with the axis 9 leads to a centrosymmetrical reciprocal position of the two poles. If the movable part of the arrangement, i.e. magnet 7 is moved by any force action out of the drawing plane, e.g. in the forward direction, magnetic direction forces occur, due to the asymmetry, which prevent a movement of the arm in a plane perpendicular to the drawing plane. As lateral force components which can act on the pickup arm are very small, due to the limited dimensions and weights, a very great "rigidity" in this forbidden direction can be obtained through the use of correspondingly dimensioned magnets. In the case of a suitable design, all these requirements can also be fulfilled with one permanent magnet and a soft magnetic counterpart, as was briefly described in connection with relieving the jewel bearing.

Another degree of freedom of the movement of the pickup arm is necessary. The tip of scanning head 3 must be placed on or removed from the surface of the record. This means a tilting movement of axis 9 about jewel bearing 4 within the drawing plane. In order to permit this movement, fixed magnet 8 is given a width which coincides with the diameter of the movable magnet 8 and is made longer in the direction of the drawing plane, so that within the requisite angle of the tilting movement between the two pole faces there can be no magnetic directing force, because the symmetrical field distribution in this range is retained in all positions. In order that in this movement direction the reciprocal magnet interactions remain positionally independent, the bottom of fixed magnet 8 is made curved with a radius the same as the distance from the point of support in order to maintain a reciprocal spacing of the two pole faces which is independent of the angle of tilt. In practice, the angular movements which occur are so small that the face can also be made planar without any significant error.

It has already been stated that the forces of attraction between the fixed and moving magnets can be used for an operational reduction of the bearing pressure between tip 4 and jewel 5. An influencing of the magnitude of the force of attraction also implies inter alia an adjustment of the spacing between the magnetic poles or the pole and the soft magnetic counterpart. Contact between the two magnets would easily be possible during the adjustment of the air gap. To prevent any sticking fast in such a case, a layer of non-magnetic material is provided between the poles for safety purposes. As an example, the drawing shows a foil 10 on the bottom of fixed magnet 8.

There are numerous possibilities for adapting the dimensions to practical requirements, because numerous variants are available for the ferrites generally used for permanent magnets, and this applies regarding the attainable field strength, magnetization direction, uniformity, etc. Various constructional solutions are also possible for the damping by means of a viscous liquid, not shown in the drawing. As an example, the lower part of axis 9, i.e. part which passes into tip 4 below arm 1, can be enclosed in a cup with silicone and this may optionally additionally apply to the complete thrust bearing with jewel 5.

All the constructional details required for the practical realisation of the represented principle are not shown in the drawing. For reasons of clarity, e.g. the arrangement of the advantageously optically effected scanning of the central position of the pickup arm is not shown. The latter is generally constructed as a differential illumination change between two light-sensitive semiconductor elements. In addition, the four terminals for the sound pickup head must be provided. Details of this type which are well known and not immediately linked with the operation have been omitted.

This arrangement of a support for the scanning system which permits substantially friction-free movements of the pickup arm for the scanning head can be used with particular advantage for short pickup arms in tangential guides, but the use of the principle is in no way limited to such constructions.

What is claimed is:

1. A pickup arm device for a record player, the device being of the type which has a short pickup arm and is guided along a guide direction substantially parallel to a radius of the record to be played by the record player, so that the arm remains oriented substantially tangential to the grooves of the record, wherein the improvement comprises:

thrust bearing means for supporting said arm mechanically from below at only a single point, said thrust bearing means having a movable bearing member with a movable bearing axis and a fixed bearing member with a fixed bearing axis, said movable bearing member being fastened to said pickup arm, and magnetic means including a movable magnetic member fastened to said arm and a fixed magnetic member separated from said movable magnetic member by an air gap and fixed in relation to said fixed bearing member for acting through said air gap to partially support said arm from above and constrain its movement to a rotation about said movable bearing axis and a pivoting of said movable bearing axis in a plane substantially perpendicular to said guide direction.

2. A pickup arm device according to claim 1 wherein said movable magnetic member comprises a first permanent magnet carried by the upper portion of said arm, said fixed magnetic member comprises a second permanent magnet mounted above said first magnet, and wherein the polarities of said magnets at said air gap are opposite.

3. A pickup arm device according to claim 1 wherein said permanent magnet is mounted on said arm above said bearing and has a circular cross-section and is aligned in such a way with reference to said bearing that the central axis thereof passes through said bearing.

4. A pickup arm device according to claim 1 wherein said movable magnetic member is cylindrical and said fixed magnetic member arranged above said pickup arm has a width which coincides with the diameter of said cylindrical permanent magnet fixed to said arm in the direction of a record radius, but has a larger dimension at right angles thereto in the tangential direction of the record grooves.

5. A pickup arm device according to claim 1, wherein the centre of gravity of the complete movable system is located on the connecting line between said bearing and the tip of a scanning needle.

6. A pickup arm device according to claim 1, wherein the vibration system formed by the moment of inertia of said arm and the magnet directing forces is damped in such a way that an energy factor of less than unity is attained.

7. A pickup arm device according to claim 1, wherein the movements of said arm are damped by a viscous liquid.

8. A pickup arm device according to claim 1, wherein said bearing for said arm is constructed as a hardened tip located in a depression in a jewel.

* * * * *